(12) United States Patent
Holland et al.

(10) Patent No.: US 6,444,776 B1
(45) Date of Patent: Sep. 3, 2002

(54) ORGANIC POLYMERS

(75) Inventors: Troy Vernon Holland, Suwanee, GA (US); Thomas Hirt, Rebstein (CH); Jacalyn Mary Schremmer, Atlanta; Richard Carlton Baron, Alpharetta, both of GA (US); Wilson Leonard Terry, Jr., Gainesville, FL (US); Aaldert Rens Molenberg, Basel (CH)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/467,682

(22) Filed: Dec. 21, 1999

Related U.S. Application Data

(60) Provisional application No. 60/160,086, filed on Dec. 21, 1998.

(51) Int. Cl.[7] ............................................. C08G 77/26
(52) U.S. Cl. ........................... 528/26; 528/28; 528/59; 528/68; 528/85; 528/76; 528/77; 528/337; 528/342; 528/345; 528/364; 528/367; 523/106; 523/107; 264/331.11; 264/331.18; 264/331.15; 264/331.16
(58) Field of Search ............................. 528/26, 28, 59, 528/68, 76, 85, 77, 367, 337, 342, 345, 364; 523/106, 107; 264/331.11, 331.18, 331.15, 331.16

(56) References Cited

U.S. PATENT DOCUMENTS

| | | | | |
|---|---|---|---|---|
| 4,659,777 A | * | 4/1987 | Riffle et al. | 525/100 |
| 5,153,273 A | * | 10/1992 | Kobayashi | 525/412 |
| 5,357,013 A | * | 10/1994 | Bambury et al. | 526/260 |
| 5,807,944 A | * | 9/1998 | Hirt et al. | 526/279 |
| 6,015,609 A | * | 1/2000 | Chaouk et al. | 428/308.4 |
| 6,039,913 A | * | 3/2000 | Hirt et al. | 264/331.11 |
| 6,200,589 B1 | * | 3/2001 | Kennedy et al. | 424/424 |

FOREIGN PATENT DOCUMENTS

| | | |
|---|---|---|
| JP | 49054499 A | 5/1974 |
| WO | WO 99/12059 | 8/1998 |

OTHER PUBLICATIONS

Polymer Synthesis Based on 2–(Hydroxyphenyl)–2–Oxazolines, Kobayashi, Shiro, et al, Makromol Chem., 185, 441–451 (1984).

Synthesis of Acryl–and Methacryl–type Macromonomers and Telechelics by Utilizing Living Polymerization of 2–Oxazolines, Kobayashi, Shiro, et al, Macromolecules, 22, 1989, 2878–2884.

Synthesis of Poly(2Methyl–2–Oxazoline) Macromers, Kobayashi, Shiro, et al, Polymer Bulletin 13, 1985, 447–451.

Sythesis of Novem Macromonomers and Telechelics of Poly (2–alkyl–2–oxazoline)s, Shimano, Yasuo, et al., Journal of Polymer Science: Part A: Polymer chemistry, vol. 33, 1995, 2715, 2723.

Synthesis of Poly (2–oxazoline) Macromonomers Having a Vinyl Ester Group, Uyama, Hiroshi, et al, Macromolecules 24, 1991, 614–615.

* cited by examiner

*Primary Examiner*—Margaret G. Moore
(74) *Attorney, Agent, or Firm*—R. Scott Meece; Jian S. Zhou; Richard Gearhart

(57) ABSTRACT

The present invention relates to novel crosslinkable amphiphilic block copolymers of formula $$A\text{---}[L\text{---}B]_n, \tag{1}$$

wherein the variables are as defined in the claims, a process for their preparation and their use for the manufacture of mouldings. The block copolymers of the invention are especially useful for the manufacture of ophthalmic mouldings such as in particular contact lenses.

18 Claims, No Drawings

ORGANIC POLYMERS

This application claims priority from provisional application Ser. No. 60/160,086, filed Dec. 21, 1998.

The present invention relates to novel crosslinkable copolymers, to a process for the preparation thereof and to the use thereof for the manufacture of mouldings, especially ophthalmic mouldings.

U.S Pat. No. 5,807,944 discloses crosslinkable amphiphilic block copolymers comprising a hydrophobic polysiloxane middle block to which are linked two polyoxazoline blocks via an alkylene bridge member. According to the present invention there are provided—by means of an alternative synthetic route—novel crosslinkable block copolymers comprising a hydrophobic block and one or more polyoxazoline blocks that are linked to the hydrophobic block via specific functional groups. Said novel synthetic route allows to design specific crosslinkable amphiphilic block copolymers with further improved properties which are particularly useful in the manufacture of ophthalmic mouldings such as contact lenses.

The present invention thus in one aspect relates to an amphiphilic block copolymer of formula

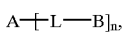 (1)

wherein

A is a hydrophobic segment selected from the group consisting of a polysiloxane, a perfluoroalkyl polyether; a polymer of a conjugated aliphatic or alicyclic diene, a polymer of an alkyne or dialkyne, an optionally partially hydrated copolymer of a conjugated diene and a hydrophilic or hydrophobic vinylic monomer, and a polysulfone;

B is a hydrophilic segment of formula

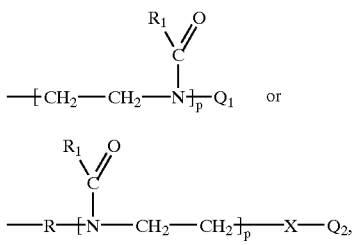

wherein $R_1$ is hydrogen, $C_1$–$C_{12}$-alkyl or $C_3$–$C_{12}$-alkenyl which is in each case unsubstituted or substituted by hydroxy or fluoro and/or uninterrupted or interrupted by oxygen, an ester and/or an urethane group, or is $C_5$–$C_8$-cycloalkyl, phenyl or benzyl, R is $C_1$–$C_{12}$-alkylene, $C_7$–$C_{12}$-aralkylene or unsubstituted or $C_1$–$C_4$-alkyl-substituted phenylene, $Q_1$ and $Q_2$ are each independently of the other an organic radical that comprises at least one crosslinkable group or, if $R_1$ comprises an alkenyl group, may also be $C_1$–$C_2$-alkyl or benzyl, X is a group —O—, —S—, —NR'— or —N(R')$_2^+$—An$^-$ wherein R' is hydrogen or $C_1$–$C_4$-alkyl and An$^-$ is an anion, and p is an integer from 2 to 150;

L is a bivalent linking group of formula

—$X_1$—$R_2$—$X_2$— (3a),

—$X_1$—C(O)—NH—$R_2$—NH—C(O)—$X_2$— (3b),

—$X_1$—C(O)—$R_2$—C(O)—$X_2$— (3c),

—$X_1$—C(O)—(R*)$_c$— (3d),

—C(O)—$X_1$— (3e), or

—$X_1$—C(O) $X_2$— (3f), wherein $X_1$ and $X_2$ are each independently of the other a group —O—, —S— or —NR$_0$—, $R_0$ is hydrogen or $C_1$–$C_4$-alkyl, $R_2$ is linear or branched $C_1$–$C_{18}$-alkylene or unsubstituted or $C_1$–$C_4$-alkyl- or $C_1$–$C_4$-alkoxy-substituted $C_{6-10}$-arylene, $C_7$–$C_{18}$-aralkylene, $C_{6-C10}$-arylene-$C_1$–$C_2$-alkylene-$C_6$–$C_{10}$-arylene, $C_3$–$C_8$-cycloalkylene, $C_{3-8}$-cycloalkylene-$C_1$–$C_6$-alkylene, $C_3$–$C_8$-cycloalkylene-$C_1$–$C_2$-alkylene-$C_3$–$C_8$-cycloalkylene or $C_1$–$C_6$-alkylene-$C_3$–$C_8$-cycloalkylene-$C_1$–$C_6$-alkylene, R* is $C_1$–$C_4$-alkylene or benzylene, c is 1 if B is a radical of formula (2) and is 0 if B is a radical of formula (2a); and n is an integer $\geq 1$.

Preferred hydrophobic segments A comprise a perfluoroalkyl polyether or particularly a polysiloxane.

According to one preferred embodiment of the invention, the segment A comprises a polysiloxane block having terminal alkylene groups of formula

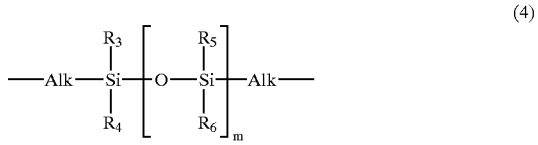 (4)

in which m is an integer from 5 to 700; Alk is alkylene having up to 20 carbon atoms which may be interrupted by —O—; 80–100% of the radicals $R_3$, $R_4$, $R_5$ and $R_6$, independently of one another, are $C_1$–$C_8$-alkyl and 0–20% of the radicals $R_3$, $R_4$, $R_5$ and $R_6$, independently of one another, are $C_3$–$C_{12}$-alkenyl, unsubstituted or $C_1$–$C_4$ alkyl- or $C_1$–$C_4$-alkoxy-substituted phenyl, fluoro($C_1$–$C_{18}$-alkyl) or cyano ($C_1$–$C_{12}$-alkyl).

In a preferred meaning, m is an integer from 10 to 500, more preferably 10 to 300, particularly preferably 20 to 150 and in particular 50 to 140.

In a preferred meaning, 80–100%, preferably 85–100%, in particular 90–100%, of the radicals $R_3$, $R_4$, $R_5$ and $R_6$, are, independently of one another, alkyl having up to 6 carbon atoms, particularly preferably alkyl having up to 4 carbon atoms, especially alkyl having up to 2 carbon atoms. A further particularly preferred meaning of $R_3$, $R_4$, $R_5$ and $R_6$ is methyl.

In a preferred meaning, 0–20%, preferably 0–15%, in particular 0–10%, of the $R_3$, $R_4$, $R_5$ and $R_6$ are, independently of one another, $C_3$–$C_8$-alkenyl, unsubstituted or $C_1$–$C_2$-alkyl- or $C_1$–$C_2$-alkoxy-substituted phenyl, fluoro ($C_1$–$C_8$-alkyl), e.g., trifluoropropyl, or cyano($C_1$–$C_4$-alkyl).

According to another embodiment of the invention, the oxygen-permeable polymer in segment A comprises a perfluoroalkyl-polyether block of Formula (II)

—(E)$_k$—Z—CF$_2$—(OCF$_2$)$_x$—(OCF$_2$CF$_2$)$_y$—OCF$_2$—Z—(E)$_k$ (5)

in which x+y is a number in the range from 10 to 100; each Z, independently of the others, is a divalent radical having up to 12 carbon atoms or a bond; each E, independently of the others, is alkoxy, e.g. —(OCH$_2$CH$_2$)$_q$, where q has a value of from 0 to 2 as a statistical average, and where the link —Z—E— represents the sequence —Z—(OCH$_2$CH$_2$)$_q$—; and k is 0 or 1.

Z is preferably a bond, $C_1$–$C_8$-alkylene or —CONH-phenylene, in which the —CO— moiety is linked to a $CF_2$ group. Z is particularly preferably $C_1$–$C_4$-alkylene, in particular methylene.

The perfluoroalkoxy units $OCF_2$ and $OCF_2CF_2$ having the indices x and y in Formula (5) can have a random distribution. The sum of the indices x+y is preferably a number in the range from 10 to 50, particularly preferably from 10 to 30. The ratio x:y is preferably in the range from 0.5 to 1.5, in particular in the range from 0.8 to 1.2.

In another embodiment of the invention, the segment A comprises an unsaturated polymer, e.g., a polymer of a conjugated aliphatic or alicyclic diene, which may be substituted by halogen or $C_1$–$C_6$-alkyl, a polymer of an alkyne or dialkyne, which may be substituted by $C_1$–$C_6$-alkyl or trimethylsilyl, a copolymer of a conjugated diene and a hydrophilic or hydrophobic vinylic monomer, or a partially hydrated derivatives of the mentioned compounds.

Specific examples of preferred unsaturated polymers are cis-, trans, iso- or syndiotactic poly-1,2-butadiene, poly-1,4-butadiene or polyisoprene; poly-pentenamer; polychloroprene; polypiperylen; butadiene- or isoprene-copolymers with hydrophilic or hydrophobic vinylic monomers, such as acrylonitrile, styrene, acrylic acid or hydroxyethylmethacrylate; or poly-1-trimethylsilyl-propyne. An especially preferred unsaturated polymer is selected from syndiotactic poly-1,2-butadiene, poly-1,4-butadiene and polyisoprene. An especially preferred unsaturated polymer is poly-1-trimethylsilyl-propyne. Another especially preferred unsaturated polymer is poly-1,4-butadiene.

In a further embodiment of the invention, the segment A comprises a polysulfone comprising at least one of the structural elements (6a) to (6d)

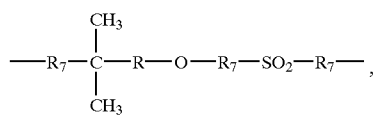
(6b)

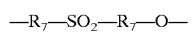 (6c), or

 (6d)

wherein $R_7$ in structural element (6a) is $C_1$–$C_8$-alkylene or $C_6$–$C_{14}$-arylene, in particular $C_1$–$C_4$-alkylene or phenylene, and $R_7$ in structural elements (6b), (6c) and (6d) is $C_6$–$C_{14}$-arylene, especially phenylene.

In one embodiment of the invention, the segment A may comprise one of the polymers illustrated above. According to another embodiment, the polymer in segment A may comprise more than one kind of polymers as illustrated above, e.g., may comprise perfluoroalkylene polyether or polybutadiene subsegments (a) and polysiloxane subsegments (b).

Segments A of the prepolymers of the invention have a mean molecular weight of for example in the range from about 1,000 to about 50,000, preferably in the range from about 1,500 to about 30000 and particularly preferably in the range from about 2,000 to about 20,000.

Regarding the hydrophilic blocks of formula (2) or (2a), $R_1$ is preferably $C_1$–$C_8$-alkyl which is unsubstituted or substituted by hydroxy or fluorine and/or is uninterrupted or interrupted by —O—; or is $C_3$–$C_8$-alkenyl; or is a radical —$(CH_2)_{1-4}$—O—$R_8$ wherein $R_8$ is acryloyl, methacryloyl or a group —C(O)—NH—$(CH_2)_{2-4}$—O—C(O)—C($R_9$)=$CH_2$ and $R_9$ is hydrogen or methyl. $R_1$ is more preferably $C_1$–$C_4$-alkyl, hydroxy-$C_1$–$C_4$-alkyl, trifluoromethyl or a radical —$(CH_2)_{1-4}$—O—$R_8$ wherein $R_8$ is acryloyl, methacryloyl or a group —C(O)—NH—$(CH_2)_2$—O—C(O)—C($R_9$)=$CH_2$, and $R_9$ is as defined above. $R_1$ is most preferably methyl.

R is preferably methylene, benzylene or in particular 1,2-, 1,3- or 1,4-phenylene.

p is preferably an integer from 4 to 100, more preferably from 4 to 50, and in particular from 5 to 20.

Suitable radicals $Q_1$ are, for example, of formula

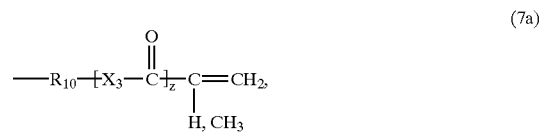
(7a)

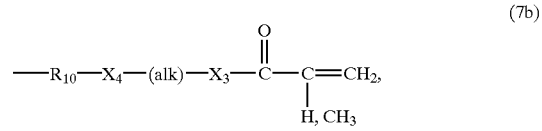
(7b)

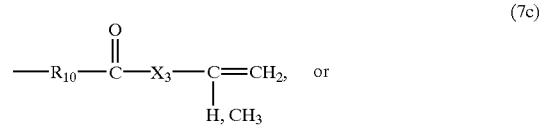
(7c)

(7d)

wherein $X_3$ is —O— or —NR", R" is hydrogen or $C_1$–$C_4$-alkyl, $X_4$ is a group —C(O)—O—, —O—C(O)—NH— or —NH—C(O)—O—, (alk) is $C_1$–$C_8$-alkylene, z is an integer of 0 or 1, and $R_{10}$ is $C_1$–$C_{12}$-alkylene, phenylene or $C_7$–$C_{12}$-phenylenealkylene.

R" is preferably methyl, ethyl or, in particular, hydrogen. $X_3$ in formula (7a) is preferably —O— or —NH—. $X_3$ in formula (7b) is preferably—NH —. $X_3$ in formula (7c) is preferably —O—. $X_4$ is preferably the radical —NH—C(O)—O—. $R_{10}$ is preferably $C_1$–$C_6$-alkylene or benzyl and more preferably $C_1$–$C_4$-alkylene or benzyl, and most preferably methyl, ethyl or benzyl. (alk) is preferably $C_2$–$C_6$-alkylene and in particular $C_2$–$C_4$-alkylene. z is preferably the number 1.

Some examples of suitable radicals $Q_1$ are o-, m- or p-vinylbenzyl, allyl, acryloyl-$C_1$–$C_4$-alkyl, in particular acryloylethyl, methacryloyl-$C_1$–$C_4$-alkyl, in particular methacryloylethyl, acrylamido-$C_1$–$C_4$-alkyl, in particular acrylamidoethyl, methacrylamido-$C_1$–$C_4$-alkyl, in particular methacrylamidoethyl, vinyloxycarbonyl-$C_1$–$C_4$-alkyl, in particular vinyloxycarbonylmethyl or vinyloxycarbonylethyl, and vinylcarbonyl.

$Q_1$ or $Q_2$ as a radical that is devoid of a crosslinkable group are preferably benzyl or in particular methyl.

The variable X is preferably a group —O— or —NR'—, wherein R' is hydrogen or $C_1$–$C_4$-alkyl, more preferably a group —O— or —N($C_1$–$C_2$-alkyl)- and most preferably a group —O— or —NH—.

The radical $Q_2$ corresponds, for example, to a group $R_{11}$ or a radical of formula(8b) as mentioned below or to a radical of formula

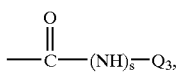

(8)

wherein $Q_3$ is, for example, a radical of formula

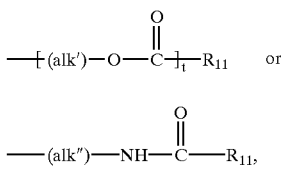

(alk') is linear or branched $C_2$–$C_{12}$-alkylene, alk" is linear or branched $C_1$–$C_{12}$-alkylene, $R_{11}$ is an olefinically unsaturated copolymerisable radical having from 2 to 24 carbon atoms which may be further substituted, and each of s and t independently of the other is the number 0 or Suitable substituents on the olefinic $C_2$–$C_{24}$ radical $R_{11}$ are, for example, $C_1$–$C_4$alkoxy, halogen, phenyl or carboxy. $R_{11}$ is, for example, a radical of formula

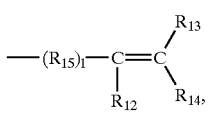

(9)

wherein l is the number 0 or 1, $R_{12}$ is hydrogen, $C_1$–$C_4$-alkyl or halogen, each of $R_{13}$ and $R_{14}$ independently of the other is hydrogen, $C_1$–$C_4$-alkyl, phenyl, carboxy or halogen, and $R_{15}$ is linear or branched $C_1$–$C_{12}$-alkylene or unsubstituted or $C_1$–$C_4$-alkyl- or $C_1$–$C_4$-alkoxy-substituted phenylene or $C_7$–$C_{12}$-aralkylene.

When $R_{15}$ is a phenylene radical, it is, for example, unsubstituted or methyl- or methoxy-substituted 1,2-, 1,3- or 1,4-phenylene. Preferably, $R_{15}$ as a phenylene radical is 1,3- or 1,4-phenylene.

When $R_{15}$ is an aralkylene radical, it is, for example, unsubstituted or methyl- or methoxy-substituted benzylene, wherein the methylene group is bonded to the amine nitrogen in each case. Preferably, Z' as an aralkylene radical is the 1,3- or 1,4-phenylenemethylene radical, wherein the methylene group is bonded to the amine nitrogen —NH— in each case.

$R_{15}$ is preferably unsubstituted or methyl- or methoxy-substituted phenylene or phenylenemethylene or $C_1$–$C_{12}$alkylene, more preferably 1,3- or 1,4-phenylene or $C_1$–$C_6$alkylene, especially $C_1$–$C_2$alkylene and most preferably methylene.

l is the number 1 or, preferably, the number 0. $R_{12}$ is preferably hydrogen, methyl or chlorine and most preferably hydrogen or methyl.

Each of $R_{13}$ and $R_{14}$ independently of the other is preferably hydrogen, carboxy, chlorine, methyl or phenyl. In a preferred embodiment of the invention, $R_{13}$ is hydrogen, chlorine, methyl or phenyl and $R_{14}$ is hydrogen or carboxy. Most preferably, $R_{13}$ and $R_{14}$ are each hydrogen.

Examples of suitable radicals $R_{11}$ are vinyl, 1-methylvinyl, 2-propenyl, allyl, 2-butenyl, o-, m- or p-vinylphenyl, styryl, 2-carboxyvinyl, 2-chloro-2-carboxyvinyl, 1,2-dichloro-2-carboxyvinyl, 1,2-dimethyl-2-carboxyvinyl and 2-methyl-2-carboxyvinyl.

Especially preferred radicals $R_{11}$ correspond to formula (9) wherein l is 0, $R_{12}$ is hydrogen or methyl, $R_{13}$ is hydrogen, methyl, chlorine or phenyl, in particular hydrogen, and $R_{14}$ is carboxy or particularly hydrogen.

Other especially preferred radicals $R_{11}$ correspond to the above formula (9) wherein l is 1, $R_{15}$ is 1,3- or 1,4-phenylene or $C_1$–$C_6$-alkylene, especially $C_1$–$C_2$-alkylene, $R_{12}$ is hydrogen or methyl and $R_{13}$ and $R_{14}$ are each hydrogen.

(alk') is preferably $C_2$–$C_6$-alkylene, more preferably $C_2$–$C_4$-alkylene and in particular ethylene.

(alk") is preferably $C_1$–$C_4$-alkylene, especially methylene or 1,1-dimethylmethylene.

One group of suitable radicals $Q_2$ corresponds to the above formula (8) wherein s is 0 and $Q_3$ is a radical of the above formula (8a) wherein t is 0 and for $R_{11}$ the above given meanings and preferences apply. A second group of suitable radicals $Q_2$ corresponds to the above formula (8) wherein s is t and $Q_3$ is a radical of the above formula (8a) wherein t is 0 and for $R_{11}$ the above given meanings and preferences apply. Another group of suitable radicals $Q_2$ corresponds to the above formula (8) wherein s is 1 and $Q_3$ is a radical of the above formula (8a) wherein t is 1 and for $R_{11}$ and (alk') each the above given meanings and preferences apply. Still a further group of suitable radicals $Q_2$ corresponds to the above formula (8') wherein s is 0 and $Q_3$ is a radical of the above formula (8b) wherein for $R_{11}$ and (alk") each the above given meanings and preferences apply.

In case that $Q_2$ is a group $R_{11}$ or a radical of formula (8), X is preferably the group —O— or —NH—. In case that $Q_2$ is a radical of formula (8b), X is preferably a group —N(CH$_3$)$_2$$^+$—An$^-$ wherein An$^-$ is halogen, for example iodine or chlorine, or a sulfonate, for example the triflate anion.

Especially preferred radicals —X—$Q_2$ correspond to formula

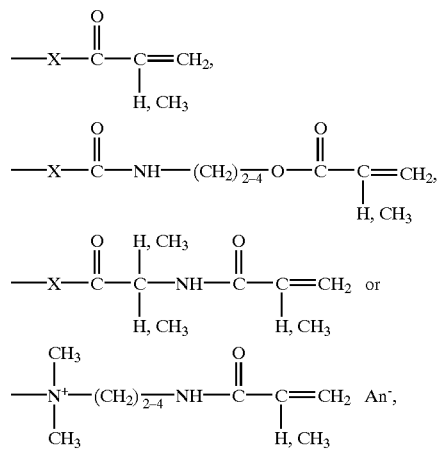

wherein for X and An$^-$ each the above given meanings and preferences apply.

The hydrophilic blocks of formula (2) or (2a) have an weight average molecular weight of, for example, 200 to 20000, preferably 250 to 12500, more preferably from 350 to 5000, and in particular 500 to 2500. The block copolymers of the invention preferably comprise hydrophilic segments of formula (2), wherein the above given meanings and preferences apply.

The variable n in formula (1) is for example an integer from 1 to 20, preferably from 1 to 10, more preferably from 2 to 8 and even more preferably from 2 to 6. One especially preferred embodiment of the invention relates to block copolymers of formula (1), wherein n is the number 2.

Another preferred embodiment relates to block copolymers of formula (1), wherein n is an integer from 3 to 8 and in particular 4 to 6.

The linking groups L of formulae (3a)–(3f) are to be understood that the left bond is directed to A and the right bond is directed to B.

If $X_1$ or $X_2$ is a group —$NR_0$—, $R_0$ is preferably methyl, ethyl or in particular hydrogen.

Preferably one of $X_1$ and $X_2$ in formula (3a) is —O— or —NH— and the other one is —O—, —S— or —NH—. More preferably $X_1$ and $X_2$ are each independently of the other —O— or —NH —.

In formulae (3b)–(3f) $X_1$ and $X_2$ are each independently of the other preferably a group —O— or —$NR_0$— and more preferably —O— or —NH —.

$R_2$ as alkylene in formulae (3a) and (3c) is preferably linear or branched $C_1$–$C_{12}$-alkylene, more preferably $C_1$–$C_6$-alkylene and most preferably $C_1$–$C_4$-alkylene.

$R_2$ as alkylene in formula (3b) is preferably a linear or branched $C_3$–$C_{14}$alkylene radical, more preferably a linear or branched $C_4$–$C_{12}$alkylene radical and most preferably a linear or branched $C_6$–$C_{10}$alkylene radical. Some preferred alkylene radicals are 1,4-butylene, 2,2-dimethyl-1,4-butylene, 1,5-pentylene, 2,2-dimethyl-1,5-pentylene, 1,6-hexylene, 2,2,3- or 2,2,4-trimethyl-1,5-pentylene, 2,2-dimethyl-1,6-hexylene, 2,2,3- or 2,2,4- or 2,2,5-trimethyl-1,6-hexylene, 2,2-dimethyl-1,7-heptylene, 2,2,3- or 2,2,4- or 2,2,5- or 2,2,6-trimethyl-1,7-heptylene, 1,8-octylene, 2,2-dimethyl-1,8-octylene and 2,2,3- or 2,2,4- or 2,2,5- or 2,2,6- or 2,2, 7-trimethyl-1, 8-octylene.

When $R_2$ is arylene, it is, for example, naphthylene or especially phenylene, each of which may be substituted, for example, by $C_1$–$C_4$-alkyl or by $C_1$–$C_4$-alkoxy. Preferably, $R_2$ as arylene is 1,3- or 1,4-phenylene that is unsubstituted or substituted by $C_1$–$C_4$-alkyl or by $C_1$–$C_4$-alkoxy in the ortho-position to at least one linkage site Examples of substituted arylene are 1-methyl-2,4-phenylene, 1,5-dimethyl-2,4-phenylene, 1-methoxy-2,4-phenylene and 1-methyl 2,7-naphthylene.

$R_2$ as aralkylene is preferably naphthylalkylene and most preferably phenylalkylene. The alkylene group in aralkylene contains preferably from 1 to 12, more preferably from 1 to 6 and most preferably from 1 to 4 carbon atoms. Most preferably, the alkylene group in aralkylene is methylene or ethylene. Some examples are 1,3- or 1,4-benzylene, naphth-2-yl-7-methylene, 6-methyl-1,3- or -1,4-benzylene and 6-methoxy-1,3- or -1,4-benzylene.

When $R_2$ is cycloalkylene, it is preferably $C_5$–$C_6$cycloalkylene and most preferably cyclohexylene that is unsubstituted or substituted by methyl. Some examples are 1 ,3-cyclo-butylene, 1,3-cyclopentylene, 1,3- or 1,4-cyclohexylene, 1,3- or 1,4-cycloheptylene, 1,3- or 1,4- or 1,5-cyclooctylene, 4-methyl-1,3-cyclopentylene, 4-methyl-1,3-cyclohexylene, 4,4-dimethyl-1 ,3-cyclohexylene, 3-methyl- or 3,3-dimethyl-1 ,4-cyclohexylene, 3,5-dimethyl-1,3-cyclohexylene and 2,4-dimethyl-1,4-cyclohexylene.

When $R_2$ is cycloalkylene-alkylene, it is preferably cyclopentylene-$C_1$–$C_4$-alkylene and especially cyclohexylene-$C_1$–$C_4$-alkylene, each unsubstituted or mono- or poly-substituted by $C_1$–$C_4$-alkyl, especially methyl. More preferably, the group cycloalkylene-alkylene is cyclo-hexylene-ethylene and, most preferably, cyclohexylene-methylene, each unsubstituted or substituted in the cyclohexylene radical by from 1 to 3 methyl groups. Some examples are cyclopent-1-yl-3-methylene, 3-methyl-cyclopent-1-yl-3-methylene, 3,4-dimethyl-cyclopent-1-yl-3-methylene, 3,4,4-trimethyl-cyclopent-1-yl-3-methylene, cyclohex-1-yl-3- or 4-methylene, 3- or 4- or 5-methyl-cyclohex-1-yl-3- or -4-methylene, 3,4- or 3,5-dimethyl-cyclohex-1-yl -4-methylene and 3,4,5- or 3,4,4- or 3,5,5-trimethyl-cyclohex-1-yl-3- or -4-methylene.

When $R_2$ is alkylene-cycloalkylene-alkylene, it is preferably $C_1$–$C_4$-alkylene-cyclopentylene-$C_1$–$C_4$-alkylene and especially $C_1$–$C_4$-alkylene-cyclohexylene-$C_1$–$C_4$-alkylene, each unsubstituted or mono- or poly-substituted by $C_1$–$C_4$-alkyl, especially methyl. More preferably, the group alkylene-cycloalkylene-alkylene is ethylene-cyclohexylene-ethylene and, most preferably, is methylene-cyclohexylene-methylene, each unsubstituted or substituted in the cyclohexylene radical by from 1 to 3 methyl groups. Some examples are cyclopentane-1,3-dimethylene, 3-methyl-cyclopentane-1,3-dimethylene, 3,4-dimethyl-cyclopentane-1,3-dimethylene, dimethylene, 3,4,4-trimethyl-cyclopentane-1,3-dimethylene, cyclohexane-1,3- or -1,4-dimethylene, 3- or 4- or 5-methyl-cyclohexane-1,3- or -1 ,4-dimethylene, 3,4- or 3,5-dimethyl-cyclohexane-1,3- or -1,4-dimethylene, 3,4,5- or 3,4,4- or 3,5,5-trimethyl-cyclohexane-1,3- or -1,4-dimethylene.

$R_2$ as $C_3$–$C_8$-cycloalkylene-$C_1$–$C_2$-alkylene-$C_3$–$C_8$-cycloalkylene or $C_6$–$C_{10}$-arylene-$C_1$–$C_2$-alkylene-$C_6$–$C_{10}$-arylene is preferably $C_5$–$C_6$-cycloalkylene-methylene-$C_5$–$C_6$-cycloalkylene or phenylene-methylene-phenylene, each of which may be unsubstituted or substituted in the cycloalkyl or phenyl ring by one or more methyl groups.

The radical $R_2$ in formula (3b) has a symmetrical or, preferably, an asymmetrical structure.

A preferred group of linking groups L comprises those of formula (3b), wherein $R_2$ is linear or branched $C_6$–$C_{10}$alkylene; cyclohexylene-methylene or cyclohexylene-methylene-cyclohexylene each unsubstituted or substituted in the cyclohexyl moiety by from 1 to 3 methyl groups; or phenylene or phenylene-methylene-phenylene each unsubstituted or substituted in the phenyl moiety by methyl.

The bivalent radical $R_2$ in formula (3b) is derived preferably from a diisocyanate and most preferably from a diisocyanate selected from the group isophorone diisocyanate (IPDI), toluylene-2,4-diisocyanate (TDI), 4,4'-methylenebis(cyclohexyl isocyanate), 1,6-diisocyanato-2,2,4-trimethyl-n-hexane (TMDI), methylenebis(phenyl isocyanate), methylenebis(cyclohexyl-4-isocyanate) and hexamethylene diisocyanate (HMDI).

Another preferred group of linking groups L comprises those of formula (3a) or (3c), wherein $R_2$ is $C_1$–$C_6$-alkylene or 1,3- or 1,4-phenylene.

R* is preferably methylene ethylene or benzylene and in particular methylene.

Further preferred linking groups L comprise —O(O)C—$CH_2$—, —C(O)O—, —HNC(O)—$CH_2$—, —C(O)NH—, —OC(O)O— and HNC(O)NH—.

The structure of the crosslinkable copolymers of the invention may vary within wide limits. They may thus consist in one embodiment of one segment A and one segment —L—B only (diblock copolymers A—L—B), or of one segment A and two segments B linked to its termini by a linking group L (triblock copolymers B—L—A—L—B), or may have a comb-type structure wherein several fragments —L—B are pendent from one segment A (which of course may further carry one or two terminal segments B. comb-block copolymers A(—L—B)$_n$), wherein A, B and L have the above-given meaning and n is an integer $\geq 3$.

One group of preferred amphiphilic block copolymers of the invention are triblock copolymers of formula

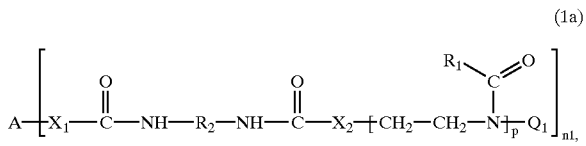

wherein n1 is an integer of 2, and for A, $R_1$, $R_2$, $Q_1$, $X_1$, $X_2$ and p the above given meanings and preferences apply.

Another group of preferred amphiphilic block copolymers of the invention are comb-block copolymers of the above formula (1 a), wherein n1 is an integer from 3 to 8 and preferably from 4 to 6, and for A, $R_1$, $R_2$, $Q_1$, $X_1$, $X_2$, p and p' the above given meanings and preferences apply.

The crosslinkable copolymers of the invention having a linking group of formulae (3a), (3b) or (3c) may be prepared, for example, by reacting a compound of formula

(i) with about n molar equivalents each of a compound of formula

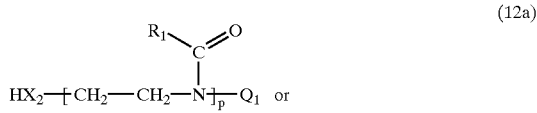

(ii) with about n molar equivalents each of a compound of the above formula (11) and

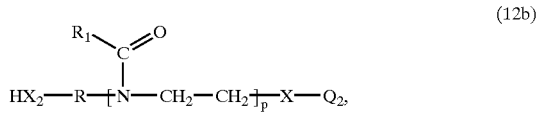

wherein Y is halogen, in particular bromine or chlorine; or is carboxy or a suitable derivative thereof, for example a group —C(O)OH, —C(O)OR$_{16}$ or —C(O)—OHal wherein $R_{16}$ is for example $C_1$–$C_4$-alkyl, phenyl or benzyl and Hal is halogen, in particular bromine or chlorine; or is a group —N=C=O; and for A, $Q_1$, $Q_2$, R, $R_1$, $R_2$, X, $X_1$, $X_2$, n and p the above given meanings and preferences apply.

The reactions of the component of formula (11) with a hydrophobic compound of formula (10) and with a hydrophilic compound of formula (12a) or (12b) are carried out, where the compound of formula (11) is an alkyl halide, for example under the conditions that are customary for the alkylation of amines, alcohols or thiols.

Where the compound of formula (11) is a carboxylic acid or a derivative thereof, e.g. a carboxylic acid halide, the reaction thereof with the components of formulae (10) and (12a) or (12b), respectively, can be carried out under the conditions that are customary for ester, thioester, or amide formation, for example at temperatures of, for example, from −40 to 80° C., preferably from 0 to 50° C. and most preferably from 0 to 25° C., in a dipolar aprotic solvent, e.g. tetrahydrofuran, dioxane, DMSO etc., or in a mixture of water and one of the mentioned solvents, in the presence of a base, e.g. an alkali metal hydroxide, and, where applicable, in the presence of a stabiliser. Suitable stabilisers are, for example, 2,6-dialkylphenols, hydroquinone derivatives, e.g. hydroquinone or hydroquinone monoalkyl ethers, or N-oxides, e.g. 4-hydroxy-2,2,6,6-tetramethyl-piperidin-1-yl. The reaction times may vary within wide limits, a period of, for example, from 30 minutes to 12 hours, preferably from 1 to 6 hours and especially from 2 to 3 hours, generally having been found practicable.

Where the compound of formula (11) is an isocyanate, the reaction thereof with the components of formulae (10) and (12a) or (12b), respectively, can be carried out under the conditions that are customary for the formation of urethanes or ureas. In case of urethane formation it is advantageously to perform the reaction in an inert solvent. Amines of the formula (10), (12a) or (12b) may be reacted with the diisocyanate of formula (11) also in an aqueous medium. It is especially advantageous to use diisocyanates having isocyanate groups of differing reactivity since the formation of isomers-and diadducts can thereby be substantially suppressed. The differing reactivity can be brought about, for example, by steric hindrance.

Suitable inert solvents for the reaction of the compounds of formulae (10) and (12a) or (12b) with a compound of formula (11) are aprotic, preferably polar, solvents, for example hydrocarbons (petroleum ether, methylcyclohexane, benzene, toluene, xylene), halogenated hydrocarbons (chloroform, methylene chloride, trichloroethane, tetrachloroethane, chlorobenzene), ethers (diethyl ether, dibutyl ether, ethylene glycol dimethyl ether, diethylene glycol dimethyl ether, tetrahydrofuran, dioxane), ketones (acetone, dibutyl ketone, methyl isobutyl ketone), carboxylic acid esters and lactones (ethyl acetate, butyrolactone, valerolactone), alkylated carboxylic acid amides (N,N-dimethylacetamide, N-methylpyrrolidone), nitriles (acetonitrile), sulfones and sulfoxides (dimethyl sulfoxide, tetramethylenesulfone). Polar solvents are preferably used. The reactants are advantageously used in equimolar quantities. The reaction temperature may be, for example, from −40 to 200° C. When catalysts are used, the temperatures may advantageously be in the range of from 0 to 50° C., preferably at room temperature. Suitable catalysts are, for example, metal salts, such as ferric chloride or alkali metal salts of carboxylic acids, tertiary amines, for example ($C_1$–$C_6$alkyl)$_3$N (triethylamine, tri-n-butylamine), N-methylpyrrolidine, N-methylmorpholine, N,N-dimethylpiperidine, pyridine and 1,4-diazabicyclooctane. Tin salts have been found to be especially effective, especially alkyltin salts of carboxylic acids, for example dibutyltin dilaurate and tin dioctoate. The isolation and purification of the compounds prepared is carried out according to known methods, for example by means of extraction, crystallisation, recrystallisation or chromatographic purification methods.

The crosslinkable copolymers of the invention having a linking group of formulae (3d) or (3e) may be prepared, for example, by reacting a compound of the formula

with about n molar equivalents of a compound of the above formula (12a) or (12b), or by reacting a compound of the above formula (10) with about n molar equivalents of a compound of formula

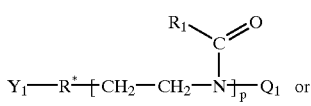

(12a′)

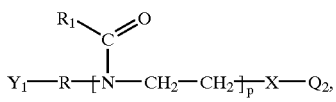

(12b′)

wherein Y, is carboxy or a suitable derivative thereof, for example a group —C(O)OH, —C(O)OR$_{16}$ or —C(O)—Hal wherein R$_{16}$ and Hal are as defined above, and for A, Q$_1$, Q$_2$, R, R*, R$_1$, X, n and p the above given meanings and preferences apply.

The reaction of the components of formulae (10a) and (12a) or (12b) or (10a) and (12a′) or (12b′), respectively, can be carried out under the conditions that are customary for ester, thioester, or amide formation, for example as outlined above.

The crosslinkable copolymers of the invention having a linking group of formulae (3f) may be prepared, for example, by reacting a compound of the above formula (10) and a compound of the above formula (12a) or (12b) with phosgen.

The compounds of formulae (10), (10a) and (11) and are known compounds or may be obtained according to methods well-known in the art.

The polyoxazoline compounds of formula (12a) (12a′), (12b) and (12b′) that are used for the preparation of the block copolymers of the invention are for the most part novel.

The invention therefore in another aspect relates to compounds of formula

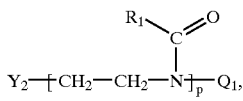

(12c)

wherein Y$_2$ is a radical —X$_2$H or —R*Y$_1$, and for R*, R$_1$, Q$_1$ X$_2$, Y$_1$ and p the above given meanings and preferences apply, subject to the provisos, (i) that Y$_2$ is not hydroxy if Q$_1$ is vinylbenzyl, vinyloxycarbonylmethyl or methacryloyloxyethyl, and (ii) that Y$_2$ is not amino if Q$_1$ is vinylbenzyl.

The invention in another aspect relates to compounds of formula

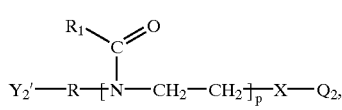

(12c′)

wherein Y$_2$′ is a radical X$_2$H or Y$_1$, and for R, R$_1$, Q$_2$, X, X$_2$, Y$_1$ and p the above given meanings and preferences apply.

The compounds of formula (12c) may be prepared, for example, by initiating a cationic ring-opening polymerization of a compound of formula

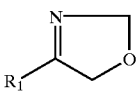

(13)

in the presence of a compound of formula $$Q_1—An \quad (14)$$

in a dipolar aprotic solvent, and terminating the resulting ionic species of formula

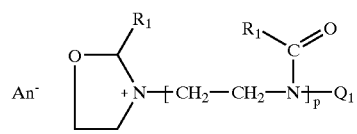

(15)

with a nucleophile that introduces the radical —X$_2$H or —R*—Y$_1$, wherein An is a radical Hal or —OSO$_2$R$_{16}$, R$_{16}$ is optionally substituted C$_1$–C$_4$-alkyl, phenyl or benzyl, for example methyl, trifluoromethyl, unsubstituted or methyl-, halogen- or nitro- substituted phenyl or fluorine- or nitro- substituted benzyl, An is an anion derived from the radical An, and R*, R$_1$, Q$_1$, X$_2$, Y$_1$, Hal and p each have the above-given meanings and preferences.

If Q$_1$ denotes an alkyl or benzyl radical, the cationic ring-opening polymerization of the compound of the above formula (13) may be caused by a suitable initiator, for example by methyl iodide, methyl p-toluenesulfonate, benzyl bromide or methyl triflate (H$_3$CO—SO$_2$—CF$_3$).

Suitable dipolar aprotic solvents for the polymerization step are for example acetonitrile, nitromethane, N,N-dimethyl formamide (DMF), N,N-dimethylacryl amide- (DMA), dimethyl sulfoxide (DMSO), or halogenated organic solvents such as chlorobenzene, dichloromethane, dichloroethane, chloroform etc.

The polymerization reaction may be performed at elevated temperature, for example at a temperature of from 25 to 150° C., preferably 30 to 120° C. and more preferably at 35 to 110° C., in the optional presence of a catalyst. A suitable catalyst is for example a iodide, for example sodium or potassium iodide. The reaction times may vary within wide limits, a time of approximately from 1 hour to five days and preferably from 2 to 24 hours having proved practicable.

The starting materials of the formula (13) are known, for example, from U.S Pat. No. 5,807,944. The compounds of formula (14) are known compounds or may be prepared according to methods known per se.

The termination of the ionic intermediates of formula (15) to yield a compound wherein Y$_2$ is hydroxy may be accomplished, for example, by treating a compound of formula (15) with an alkali hydroxide, for example potassium hydroxide or sodium hydroxide at a temperature of, for example –40 to 40° C., preferably 15 to 30° C., and in particular at room temperature. The alkali hydroxide is suitably added in form of a solution, for example an aqueous solution or a solution in a C$_1$–C$_4$-alkanol such as methanol or ethanol, to the the compound of formula (15) or to a solution or reaction mixture containing the compound of formula (15). The reaction times are not critical and amount, for example, to from 30 minutes to 5 hours and preferably from 1 to 2 hours. The introduction of the hydroxy group may also be accomplished using water with or without the addition of a base and/or an ion exchange resin.

The termination of the ionic intermediates of formula (15) with an amino or amine group $Y_2$ may be accomplished with ammonia or an organic amine. For example, the compound of formula (15) may be treated with N-methyl ethylenediamine in an dipolar aprotic solvent such as in acetonitrile at a low temperature, for example at a temperature from −50 to 0° C. and preferably at about −35° C., to yield a compound of formula (12) wherein $Y_2$ is amino.

The termination of the ionic intermediates of formula (15) with a thiol group Y2 may be accomplished, for example, analogous to Y. Shimano et al, J.Polym.Sci.,Polym.Chem 1995, 33, 2715 by a treatment of a compound of formula (15) with NaSH.

The compounds of formula (12c) having a carboxymethyl group $Y_2$ may be prepared, in analogy to Y. Shimano et al., J.Polym.Sci.,Polym.Chem. 1995, 33, 2715 by terminating an ionic intermediate of the above formula (15) with an alkali salt of a dialkyl malonate, converting the diester obtained to the corresponding dicarboxylic acid and heating the dicarboxylic acid derivative so that one carboxy group decomposes.

The compounds of formula (12c') may be prepared, for example, by initiating a cationic ring-opening polymerization of a compound of formula

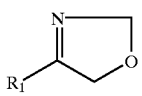
(13)

in the presence of a compound of formula $$Y_2'-R-An \qquad (14a),$$

optionally after previously protecting the group $Y_2'$, in a dipolar aprotic solvent, and terminating the resulting ionic species of formula

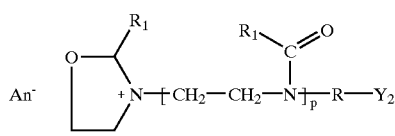
(15a)

with a nucleophile that introduces the radical —X—$Q_2$ or —XH, and, in case that a group —XH has been introduced, further reacting the resulting polymer with a compound that introduces the group $Q_2$, and, if applicable removing the protecting group of $Y_2$, wherein R, $R_1$, $Q_1$, $X_2$, $Y_2'$, An, An⁻ and p each have the above-given meanings and preferences.

The polymerization reaction of the compound of formula (13) in the presence of a compound of formula (14a) may be accomplished as described before for the corresponding reaction of the compound of formula (13) in the presence of a compound of formula (14). Suitable protecting groups of the radical $Y_2'$ are known to the art-skilled worker. The conversion of a compound of formula (15a) to a compound of formula (12c') then may be accomplished directly using for example 2-hydroxyethyl methacrylate (HEMA) or allyl amine each with or without the addition of a base or using vinyl benzyl alkoxide. In the alternative, the compounds of formula (15a) first of all may be converted to a derivative having a radical —$X_2$H which is then further reacted, for example, with 2-isocyanatoethyl methacrylate (IEM) or with a compound $Q_2$-Hal to a compound of formula (12c').

The molecular weight of the copolymers of the invention is, within wide limits, not critical. Preferably, however, the prepolymer has a weight average molecular weight of from approximately 1400 to 200000, preferably from 2000 to 100000 and more preferably from 2500 to 50000 and most preferably from 3000 to 25000.

The prepolymers of formula (1) are crosslinkable, but are uncrosslinked or, at least, substantially uncrosslinked; in addition, they are stable, that is to say spontaneous crosslinking as a result of homopolymerisation does not take place.

The prepolymers of formula (1) according to the invention are crosslinkable in a controlled and extremely effective manner, especially by photo-crosslinking.

The present invention further relates, therefore, to a polymer that can be obtained by photo-crosslinking of a prepolymer of formula (1), in the presence or, preferably, in the absence of an additional vinyl comonomer. These crosslinked polymers are water-insoluble.

In the photo-crosslinking, a photoinitiator capable of initiating free-radical crosslinking is suitably added. Examples thereof will be familiar to the person skilled in the art, suitable photoinitiators that may specifically be mentioned being benzoin methyl ether, 1-hydroxycyclohexylphenyl ketone, Darocure 1173 or Irgacure types. The crosslinking can then be brought about by actinic radiation, e.g. UV light, or ionising radiation, e.g. gamma rays or X-rays. The amount of photoinitiator may be selected within wide limits, an amount of up to 0.05 g/g of polymer and especially of up to 0.003 g/g of polymer having proved beneficial.

The crosslinkable copolymer of formula (1) is introduced into the crosslinking process preferably in pure form, particularly substantially free from undesired constituents, such as, for example, free from monomeric, oligomeric or polymeric starting compounds used for the preparation of the prepolymer, and/or free from secondary products formed during the preparation of the prepolymer. Said prepolymers in pure form are obtained advantageously by previously purifying them in a manner known per se, for example by precipitation with a suitable solvent, filtration and washing, extraction in a suitable solvent, dialysis, reverse osmoses (RO) or ultrafiltration, reverse osmoses and ultrafiltration being especially preferred.

The preferred purification processes for the prepolymers of the invention, reverse osmoses and ultrafiltration, can be carried out in a manner known per se It is possible for the ultrafiltration and reverse osmoses to be carried out repeatedly, for example from two to ten times. Alternatively, the ultrafiltration and reverse osmoses can be carried out continuously until the selected degree of purity is attained. The selected degree of purity can in principle be as high as desired.

The copolymers of formula (1) may be crosslinked, for example, in form of a solution or a mesophase.

One embodiment of the invention relates to the photopolymerisation of the block copolymers of the invention in solution, preferably in one or more different organic solvents. Suitable solvents are in principle all solvents that dissolve the polymers according to the invention and an optional vinyl comonomer which may be additionally used, e.g. alcohols, such as $C_1$–$C_6$-alkanols, e.g. n- or iso-propanol, ethanol or methanol, carboxylic acid amides, such as dimethylformamide, or dimethyl sulfoxide, and mixtures of suitable solvents, e.g. mixtures of water with an alcohol, e.g. a water/propanol, water/ethanol or a water/methanol mixture.

According to this embodiment of the invention, the photo-crosslinking is preferably effected from a solution comprising (i) one or more prepolymers according to the invention which can be obtained as a result of the preferred purification step, ultrafiltration, (ii) one or more solvents selected from the group consisting of a $C_1$–$C_6$-alkanol, a carboxylic acid amide, dimethyl sulfoxide and water, and optionally (iii) an additional vinyl comonomer. For example, photocrosslinking of the prepolymers is carried out in ethanol or n- or iso-propanol.

The vinyl comonomer that can additionally be used according to the invention in the photo-crosslinking may be hydrophilic or hydrophobic or may be a mixture of a hydrophobic and a hydrophilic vinyl monomer. Suitable vinyl monomers include especially those which are customarily used in the manufacture of contact lenses. The expression "hydrophilic vinyl monomer" is understood to mean a monomer that typically produces as homopolymer a polymer that is water-soluble or capable of absorbing at least 10% by weight water. Analogously, the expression "hydrophobic vinyl monomer" is understood to mean a monomer that typically produces as homopolymer a polymer that is water-insoluble or capable of absorbing less than 10% by weight water.

The proportion of vinyl comonomers, if used, is preferably from 0.5 to 80 units per prepolymer of formula (1), especially from 1 to 30 units of vinyl comonomer per prepolymer unit of formula (1) and most preferably from 5 to 20 units per prepolymer of formula (1).

It is also preferred to use a hydrophobic vinyl comonomer or a mixture of a hydrophobic vinyl comonomer with a hydrophilic vinyl comonomer, the mixture containing at least 50% by weight of a hydrophobic vinyl comonomer. In that manner, the mechanical properties of the polymer can be improved without the water content being appreciably reduced. In principle, however, both conventional hydrophobic vinyl comonomers and conventional hydrophilic vinyl comonomers are suitable for copolymerisation with a prepolymer of formula (1).

Suitable hydrophobic vinyl comonomers include, without the following being an exhaustive list, $C_1$–$C_{18}$alkyl acrylates and methacrylates, $C_3$–$C_{18}$alkylacrylamides and -methacrylamides, acrylonitrile, methacrylonitrile, vinyl-$C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has from 1 to 6 carbon atoms, $C_2$–$C_{10}$perfluoroalkyl acrylates and methacrylates or correspondingly partially fluorinated acrylates and methacrylates, $C_3$–$C_{12}$perfluoroalkyl-ethyl-thiocarbonylaminoethyl acrylates and methacrylates, acryloxy- and methacryloxy-alkylsiloxanes, N-vinylcarbazole, $C_1$–$C_{12}$alkyl esters of maleic acid, fumaric acid, itaconic acid, mesaconic acid and the like. Preferred are, for example, $C_1$–$C_4$alkyl esters of vinylically unsaturated carboxylic acids having from 3 to 5 carbon atoms or vinyl esters of carboxylic acids having up to 5 carbon atoms.

Examples of suitable hydrophobic vinyl comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthio-carbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyldisiloxane and bis(methacryloxypropyl)tetramethyidisiloxane.

Suitable hydrophilic vinyl comonomers include, without the following being an exhaustive list, hydroxy-substituted lower alkyl acrylates and methacrylates, acrylamide, methacrylamide, lower alkylacrylamide and -methacrylamide, ethoxylated acrylates and methacrylates, hydroxy-substituted lower alkylacrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Preferred are, for example, hydroxy-substituted $C_2$–$C_4$alkyl (meth)acrylates, five- to seven-membered N-vinyl lactams, N,N-di-$C_1$–$C_4$alkyl-(meth)acrylamides and vinylically unsaturated carboxylic acids having a total of from 3 to 5 carbon atoms.

Examples of suitable hydrophilic vinyl comonomers include hydroxyethyl methacrylate, hydroxyethyl acrylate, acrylamide, methacrylamide, dimethylacrylamide, allyl alcohol, vinylpyridine, vinylpyrrolidine, glycerol methacrylate, N-(1,1-dimethyl-3-oxobutyl)-acrylamide and the like.

Preferred hydrophobic vinyl comonomers are methyl methacrylate and vinyl acetate. Preferred hydrophilic vinyl comonomers are 2-hydroxyethyl methacylate, N-vinylpyrrolidone and acrylamide. Most preferably, the crosslinking of the copolymers of formula (1) is carried out in the absence of a vinylic comonomer.

According to another preferred embodiment of the invention, the copolymers of formula (1) are previously converted into a mesophase which is at least partly bicontinuous, and the mesophase is then subjected to photocrosslinking. A suitable process producing a mesophase-composition is disclosed in U.S. application Ser. No. 09/141,252, filed Aug. 27, 1998, which application is herein incorporated by reference.

The term mesophase in this context is to be understood as meaning a thermodynamically stable mixture of an amphiphilic substance such as a crosslinkable block copolymer of formula (1) and an aqueous solution or a melt of an above-mentioned crosslinkable amphiphilic block copolymer which shows in each case a self-assembled microstructure. Mesophases are typically homogeneous and optical transparent mixtures which lie in single phase regions of the phase diagram of the components the system is based on. These single phases may be of a liquid crystalline nature (such as lamellar, hexagonal or cubic) which indicates an ordered compartmentisation of components in the mixture with a geometrically regular and repeated structure, or may be of a non-crystalline nature in which compartmentisation is random and isotropic. An example for this latter type of mesophases is represented by microemulsions. Accordingly, many microstructures can occur within the general class of mesophases. Within the present invention, mesophases having a liquid crystalline microstructure are preferred. The mesophases of the claimed process thus preferably lie in single phase regions of the phase diagram that exhibit a crystalline structure and most preferably a cubic structure.

In addition, the mesophases of this embodiment are at least partly bicontinuous, that is to say the mixture has at least two partly bicontinuous phases, for example an oxygen-permeable and an ion-permeable phase, which are intermingled.

A "phase", as used herein, refers to a region of substantially uniform composition which is a distinct and physically separate portion of a heterogeneous polymeric material. However, the term "phase" does not imply that the material described is a chemically pure substance, but merely that certain bulk properties differ significantly from the properties of another phase within the material. Thus, with respect to the polymeric components of an ophthalmic moulding such as a lens, an ion-permeable phase refers to a region composed of essentially only ion-permeable polymer (and water, when hydrated), while an oxygen-permeable phase refers to a region composed of essentially only oxygen-permeable polymer (and perhaps a small amount of water, when hydrated).

"Bicontinuous phases", as used herein, refers to at least two regions, each of substantially uniform composition which differs from the other, and each of which exhibiting its individual properties. With respect to ophthalmic mouldings such as contact lenses it has been found that it is highly desirable to have bicontinuous phases of an oxygen-permeable polymer and an ion-permeable polymer which provide the lens with two continuous pathways or sets of continuous pathways extending from the inner surface of the lens to the outer surface of the lens. Said at least two continuous pathways ensure that the lens material has both a high oxygen transmissibility and ion or water permeability.

The mesophases may be prepared from a melt of one or more than one different prepolymers of formula (1) and optionally further components or, preferably, from (i) one or more than one different prepolymers of formula (1), (ii) an aqueous solution and optionally (iii) further components.

(ii) aqueous solution;
  The aqueous solution that is added to form the mesophase may be pure water or a mixture of water and one or more water-miscible solvents and/or salts.
(ii-a) water-miscible organic solvents;
  Examples of suitable solvents that may be added to the mesophase are a monohydric or polyhydric alcohol, for example a $C_1$–$C_8$alcohol such as n-butanol, n-propanol, ethanol or methanol or a polyhydric alcohol such as glycerol or a glycol; a polyether such as Butyl Cellosolve™, Butyl Carbitol™, Hexyl Cellosolve™, or Hexyl Carbitol™; a carboxylic acid amide, for example N,N-dimethylformamide; acetone, acetonitrile; dimethyl sulfoxide; or mixtures thereof. Preferably, the aqueous solution does not comprise any additional organic solvent or comprises a $C_1$–$C_4$alcohol, for example ethanol or methanol as additional organic solvent. In a particularly preferred embodiment of the invention, the aqueous solution does not comprise an additional organic solvent.
(ii-b) salts;
  Salts that may be comprised in the aqueous solution used to form the inventive mesophases include without limitation thereto physiologically tolerable salts, such as buffer salts customary in the field of contact lens care, for example phosphate salts, or isotonising agents customary in the field of contact lens care, such as alkali halides, for example sodium chloride, or mixtures thereof.

If salts are added, the aqueous salt solution has for example an osmolarity of from about 200 to 450 milliosmol in 1000 ml (unit: mOsm/l), preferably an osmolarity of from about 250 to 350 mOsm/l, and in particular about 300 mOsm/l.

An example of an especially suitable aqueous salt solution of the invention is an artificial, preferably buffered, lacrimal fluid that in respect of pH value and osmolarity is adapted to natural lacrimal fluid, for example, a sodium chloride solution that is unbuffered or that is preferably buffered, for example, by a phosphate buffer, and that has an osmolarity that corresponds to the osmolarity of human lacrimal fluid.

The aqueous solution employed for the formation of the mesophases of the invention is preferably a pure solution which means a solution which is free or essentially free from undesired constituents. Especially preferred examples of such solutions are pure water or an artificial lacrimal fluid, as defined hereinbefore.

(iii) optional further components;
  Optional further components which are used for the preparation of the mesophases, besides the crosslinkable block copolymer of formula (1) and the aqueous solution, are for example:
(iii-a) a photoinitiator, for example one of the photoinitiators mentioned above; (iii-b) a surfactant which may be any conventional non-ionic, cationic or zwitterionic surfactant known in the art; (iii-c) a hydrophobic or hydrophilic comonomer wherein the above given meanings and preferences apply; or (iii-d) a pharmaceutical effective agent, for example a protein, enzyme, vitamin, disinfectant, bactericide or the like.

The mesophases of the present invention may be prepared by simply admixing suitable amounts of the prepolymer of formula (1), the aqueous solution and optionally further components in any order at a temperature of, for example, 0 to 100° C., preferably 10 to 50° C., and more preferably 15 to 40° C. The mesophases may form spontaneously or upon stirring and/or standing for a suitable period. For example, the components that make up the mesophase are mixed for about 1 minute to 1 week, preferably for 30 minutes to 5 days and most preferably 2 hours to 3 days, in order to form a mesophase which is ready for being further processed according to the invention.

According to another embodiment of the invention, a mesophase may be obtained by simply preparing a melt of the prepolymer and optionally further components in the absence of an aqueous solution which is especially suited for prepolymers having a low melting or glass transition point.

The mesophases of the invention comprise, for example, from 10 to 100 percent by weight of 10 prepolymer(s) of formula (1), from about 0 to about 90 percent by weight of aqueous solution and from 0 to 40 percent by weight of further components. Preferably, the bicontinuaus. mesophases of the invention comprise from about 30 to about 85 percent by weight of prepolymer(s) of formula (1), from about 15 to a bout 70 percent by weight of aqueous solution and from 0 to 10 percent by weight of further components. Particularly preferred mesophases comprise from 30 to 75 percent by weight of prepolymer(s) of formula (1) and from 25 to 70 percent by weight of aqueous solution.

The solutions or mesophases comprising a block copolymer of formula (1) may be processed in a manner known per se to form mouldings, especially contact lenses, for example by carrying out the photo-crosslinking of the prepolymers of the invention in a suitable mould, in particular a contact lens mould. For example, the solution or mesophase is introduced into an opthalmic mould in a manner known per se, such as, especially, by conventional metering in, for example by dropwise introduction or by extrusion. Suitable moulds are generally customary contact lens moulds as known in the state of the art. Thus, the contact lenses according to the invention can be manufactured, f or example, in a manner known per se, for example in a conventional "spin-casting mould", as described, for example, in U.S. Pat. No. 3,408,429, or by the so-called Full-Mould process in a static mould, as described, for example, in U.S. Pat. No. 4,347,198. Appropriate moulds are made, for example, from polypropylene. Quartz, sapphire glass and metals, for example, are suitable materials for re-usable moulds.

The crosslinking can be triggered in the mould, for example by actinic radiation, such as, for example, UV light, or by ionising radiation, such as, for example, gamma radiation, electron radiation or X radiation. The crosslinking can where appropriate also be triggered thermally or electrochemically. Attention is drawn to the fact that the photocrosslinking can be carried out in a very short time, for example in $\leq 60$ minutes, preferably $\leq 20$ minutes, more-preferably $\leq 5$ minutes even more preferably in $\leq 1$ minute, especially in up to 30 seconds, especially preferably, as disclosed in the examples.

The opening of the mould such that the moulding can be removed from the mould can be carried out in a manner known per se.

The mouldings obtainable from the block copolymers of formula (1) are preferably at least: partly bicontinuous, that is to say the mouldings, as stated before, have at least two partly bicontinuous phases, for example an oxygen-permeable and an ion-permeable phase, which are intermingled.

The invention further relates, therefore, to mouldings that comprise or, preferably, substantially consist of a crosslinked block copolymer of formula (1). Further examples of mouldings of the invention, apart from contact lenses, are biomedical or special ophthalmic mouldings, e.g. intraocular lenses, artificial cornea, eye dressings, mouldings for use in surgery, such as heart valves, artificial arteries or the like, and films or membranes, e.g. membranes for controlling diffusion, photo-structurable films for information storage, or photoresist materials, e.g. membranes or mouldings for etch resists or screen print resists.

If the moulding manufactured according to the invention is a contact lens and the latter has been manufactured under solventless conditions from a previously purified prepolymer of the invention, then it is normally unnecessary for the removal of the moulding to be followed by purification steps, e.g. extraction, because the prepolymers used do not contain any undesired low-molecular-weight constituents; consequently, the crosslinked product also is free or substantially free of such constituents and subsequent extraction can be dispensed with. The contact lens can accordingly be converted into a ready-for-use contact lens directly in conventional manner by hydration. Suitable forms of hydration capable of producing ready-for-use contact lenses with a wide variety of water contents are known to the person skilled in the art. The contact lens is swelled, for example, in water, in an aqueous salt solution, especially in an aqueous salt solution having an osmolarity of approximately from 200 to 450 milliosmol in 1000 ml (unit: mosm/l), preferably approximately from 250 to 350 mosm/l and especially approximately 300 mosm/l, or in a mixture of water or an aqueous salt solution with a physiologically tolerable polar organic solvent, for example glycerol. Swelling of the prepolymer in water or in aqueous salt solutions is preferred.

The aqueous salt solutions used for the hydration are advantageously solutions of physiologically tolerable salts, such as buffer salts customary in the field of contact lens care, e.g. phosphate salts, or isotonising agents customary in the field of contact lens care, such as, especially, alkali metal halides, e.g. sodium chloride, or solutions of mixtures thereof. An example of an especially suitable salt solution is a synthetic, preferably buffered, lachrymal fluid that has been matched to natural lachrymal fluid with regard to pH value and osmolarity, e.g. an unbuffered or preferably buffered, for example phosphate buffer-buffered, sodium chloride solution the osmolarity and pH value of which correspond to the osmolarity and pH value of human lachrymal fluid.

The hydration fluids defined above are preferably pure, that is to say free or substantially free of undesired constituents. Most preferably, the hydration fluid is pure water or a synthetic lachrymal fluid as described above.

If the moulding manufactured according to the invention is a contact lens and the latter has been manufactured from an aqueous mesophase of a previously purified prepolymer of the invention, the crosslinked product also will not contain any troublesome impurities. There is normally no need, therefore, for subsequent extraction. Since the crosslinking is carried out in an aqueous medium, there is also no need for subsequent hydration. In accordance with an advantageous embodiment, therefore, the contact lenses obtainable by this process are distinguished by the fact that they are suitable for use as intended without extraction or hydration. The expression "use as intended" is understood in this context to mean especially that the contact lenses can be inserted into the human eye.

The copolymers of the invention are especially suitable for the manufacture of mass-produced articles, such as, for example, contact lenses that are worn for a short time, for example for a month, a week or just one day, and are then replaced by new lenses. This is in particular because contact lenses prepared from a mesophase of the copolymers can be used for their intended use without subsequent treatment steps, such as extraction or hydration.

In addition, the contact lenses obtainable according to the invention have a range of unusual and extremely advantageous properties and are therefore suited to extended periods of wear (true extended wear, i.e., seven days or more). Among these properties are, for example, their excellent compatibility with the human cornea and with tear fluid, if necessary after suitable surface treatment (e.g. coating), which is based on a balanced ratio between water content, oxygen permeability, ion permeability and mechanical and absorptive properties. This results in high comfort and the absence of irritation and allergenic effects. Owing to their favourable permeability properties with respect to gases ($CO_2$ and $O_2$), various salts, nutrients, water and diverse other components of tear fluid, the contact lenses prepared according to the process of the invention have no effect, or virtually no effect, on the natural metabolic processes in the cornea. Furthermore, the contact lenses obtainable according to the process are optical clear and transparent, have a high shelf life and good mechanical properties, for example concerning the modulus of elasticity, elongation at break or dimensional stability.

All of the advantages mentioned above apply, of course, not only to contact lenses but also to other mouldings of the invention. The sum of the various advantageous aspects in the manufacture of the mouldings of the invention results in the mouldings of the invention being especially suitable as mass-produced articles, such as, for example, contact lenses that are worn for a short period and then replaced by new lenses.

In the Examples which follow, amounts are by weight, unless specified otherwise, and temperatures are given in degrees Celsius.

PREPARATION OF POLYOXAZOLINE PRECURSORS

EXAMPLE 1 m-Chloromethylphenyl isocyanate (1.4118 g, 8.42×10$^{-3}$ moles) is dissolved in dry acetonitrile (about 8 ml) in a dry 50 ml flask. A solution of N-(2-hydroxyethyl) methacrylamide (1.0877 g, 8.42×10$^{-3}$ moles) in dry acetonitrile (about 7 ml) is added slowly under dry nitrogen at room temperature over about 10 minutes. The solution is then warmed to 50° C for about 20 hours.

The solution of the above methacrylamide initiator is then cooled to 40° C., and dry NaI (1.229 g, 8.42×10$^{-3}$ moles), and then 2-methyl-2-oxazoline (6.423 g) are added to the solution. The solution is maintained at 40° C. until the formation of the polyoxazoline is complete (about 24 hours).

EXAMPLE 2

NaI (1.8735 g ) is added to a 100 ml round bottom flask. The flask is then flame dried under nitrogen and maintained under nitrogen for the rest of the reaction. Dry acetonitrile (12 ml), then acryloyl chloride (0.5655 g), then 2-methyl-2-oxazoline (about 5 g) are added to the flask by syringe. The solution is maintained at 40° C. until the formation of the polyoxazoline is complete (about 22 hours).

EXAMPLE 3

The procedure of Example 1 is repeated using an equivalent amount of m-chloromethyl styrene instead of the methacrylamide initiator.

PREPARATION OF FUNCTIONALIZED POLYOXAZOLINES

EXAMPLE 4

(General procedure for the preparation of hydroxy-terminated polyoxazolines): After the synthesis of the polyoxazoline precursors according to Examples 1 to 3, the respective reaction solution is cooled to room temperature and a solution of KOH or NaOH in methanol is added. The solution is stirred at room temperature for 1–2 hours, and the products of formulae

EXAMPLE 5

(General procedure for the preparation of amino-terminated polyoxazolines): To a solution of N-methyl ethylenediamine (2.468 g, 3.33×10$^{-2}$ moles) in dry acetonitrile at −35° C., the polyoxazoline-precursor solution according to Example 1, 2 or 3 (8.33×10$^{-3}$ moles of cationic end groups) is added slowly over about 10 minutes to yield the amino analogues of the above compounds [4a], [4b]or [4c].

PREPARATION OF AMPHIPHILIC BLOCK COPOLYMERS

EXAMPLE 6

The functionalized polyoxazoline [4c] obtained according to Example 4 is azeotropically distilled over molecular sieve in CH$_2$Cl$_2$. It is then reacted with 1.5 molar equivalents of isophorone diisocyanate (IPDI) in CH$_2$Cl$_2$ in the presence of dibutyltin dilaurate (DBTDL) catalyst. The product is precipitated two times in hexane and finally vacuum dried.

The polyoxazoline-IPDI adduct is dissolved in CH$_2$Cl$_2$ and the mixture is added slowly over about 1 hour at room temperature under an inert atmosphere to 102 mole % of α,ω-diaminopropyl polydimethylsiloxan (Mn =11111 g/mole) dissolved in CH$_2$Cl$_2$. When the reaction is complete, the excess solvent is removed by rotovapor, and the product is purified by reverse osmosis filtration.

Similar amphiphilic block copolymers are obtained if the functionalized polyoxazolines [4a], [4b] or the three amino analogues of Example 5 are employed into the reaction instead of polyoxazoline [4c].

PREPARATION OF A CONTACT LENS

EXAMPLE 7

The amphiphilic block copolymers obtained according to Example 6 are each formulated 80/20 with water, and more block copolymer is gradually added until a clear formulations is obtained in each case.

The formulations are cast on poly(propylene) molds, cured for 2 minutes with UV light at an intensity of 2 mW/cm$^2$ at 310 nm with a Macam lamp (400W). Following autoclaving, clear, transparent lenses having a high ion

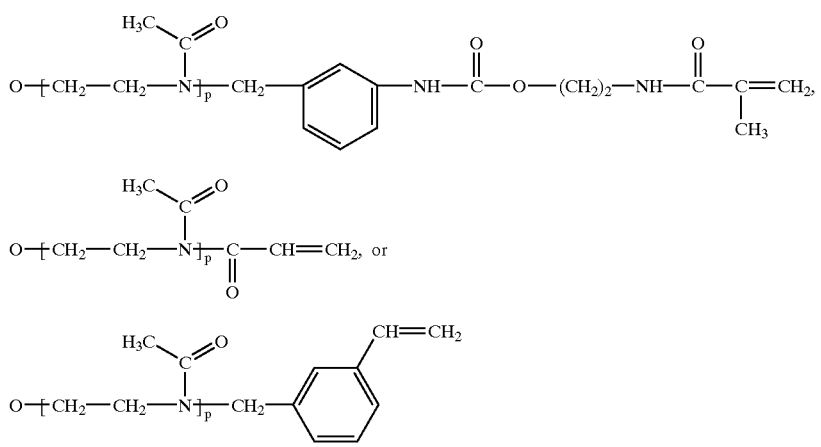

are then precipitated with diethyl ether (Weight average molecular weight Mn=1000 in each case).

permeability and oxygen permeability value are obtained in each case. Suitable methods for the determination of the ion permeability or oxygen permeability are described for example in U.S. Pat. No. 5,807,944.

What is claimed is:

1. An amphiphilic b lock copolymer of formula

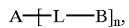  (1)

wherein

A is a hydrophobic segment selected from the group consisting of a polysiloxane, a perfluoroalkyl polyether, a polymer of a conjugated aliphatic or alicyclic diene, a polymer of an alkyne or dialkyne, an optionally partially hidrated copolymer of a conjugated diene and a hidrophilic vinylic monomer, and a polysulfone;

B is a hidrophilic segment of formula

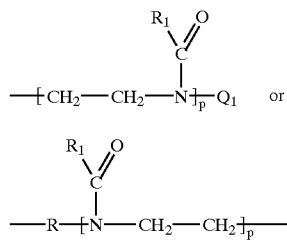

wherein $R_1$ is hydrogen, $C_1$–$C_{12}$-alkenyl which is in each case unsubstituted or substituted by hydroxy or fluoro and/or uninterrupted or interrupted by oxygen, an ester and/or an urethane group, or is $C_5$–$C_8$-cycloalkyl, phenyl or benzyl, R is $C_1$–$C_{12}$-alkylene $C_7$–$C_{12}$-aralkylene or unsubstituted or $C_1$–$C_4$-alkyl substituted phenylene, X is a group —O—, —S—, —NR'— or —N(R')$_2^+$- An$^-$ wherein R' is hydrogen or $C_1$–$C_4$-alkyl and An$^-$ is an anion, and p is an integer from 2 to 150; and L is a bivalent linking group of formula

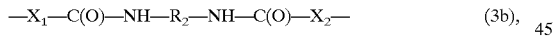  (3b),

  (3c),

  (3d),

  (3e), or

  (3f), wherein $X_1$ and $X_2$ are each independently of the other a group —O—, —S— or —NR$_0$—; R$_0$ is hydrogen or $C_1$–$C_4$-alkyl; R$_2$ is linear or branched $C_1$–$C_{18}$-alkylene, or unsubstituted or $C_1$–$C_4$-alkyl- or $C_1$–$C_4$-alkoxy-substituted $C_6$–$C_{10}$-arylene, $C_7$–$C_{18}$-aralkylene, $C_6$–$C_{10}$-arylene, $C_1$–$C_2$-alkylene-$C_6$–$C_{10}$-arylene, $C_3$–$C_8$-cycloalkylene-$C_3$–$C_8$-cycloalkylene or $C_1$–$C_6$-alkylene-$C_3$–$C_8$-cycloalkylene or $C_1$–$C_6$-alkylene-$C_3$–$C_8$-cycloalkylene-$C_1$–$C_6$-alkylene; and R* is $C_1$–$C_4$-alkylene or benzylene, c is 1 if B is a radical of formula (2) and is 0 if B is a radical of formula (2a), and n is an integer $\geq 1$ wherein $Q_1$ is a radical of formula

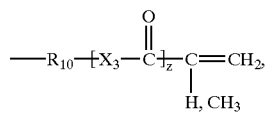  (7a)

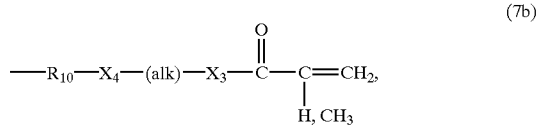  (7b)

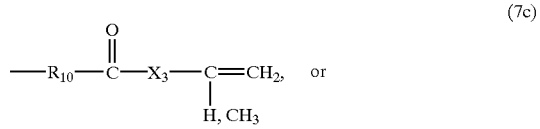  (7c)

  (7d)

wherein $X_3$ is —O— or —NH", R" is hydrogen or $C_1$–$C_4$-alkyl, $X_4$ is a group —C(O)—O—, —O—C(O)—NH—C(O)—O—, (alk) is $C_1$–$C_8$-alkylene, z is an integer of 0 or 1, and $R_{10}$ is $C_1$–$C_{12}$-alkylene, phenylene or $C_7$–$C_{12}$-phenylenealkylene; and wherein $Q_2$ is a radical of the formula

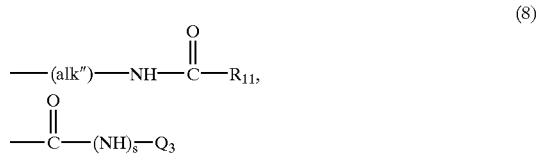  (8)

wherein $Q_3$ is, for example, a radical of formula

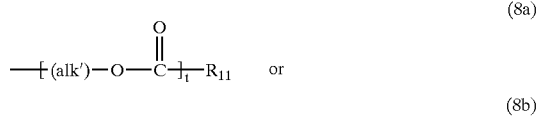  (8a)

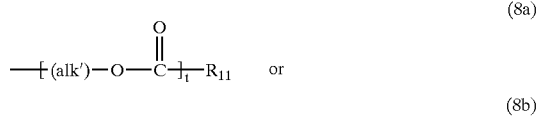  (8b)

(alk') is linear or branched $C_2$–$C_{12}$-alkylene, alk" is linear or branched $C_1$–$C_{12}$-alkylene, $R_{11}$ is an olefinically unsaturated copolymerisable radical having from 2 to 24 carbon atoms which may be further substituted, and each of s and t independently of the other is the number 0 or 1;

provided that if $R_1$ comprises an alkenyl group, then $Q_1$ and $Q_2$ may further be selected from the group consisting of $C_1$–$C_2$-alkyl radicals and benzyl.

2. A block copolymer according to claim 1, wherein the hydrophobic segment A comprises a perfluoroalkyl polyether or a polysiloxane.

3. A block copolymer according to claim 1, wherein the hydrophobic segment A is a polysiloxane of formula

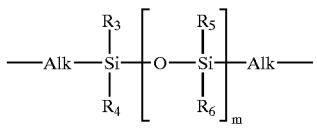
(4)

in which m is an integer from 5 to 700; Alk is alkylene having up to 20 carbon atoms which may be interrupted by —O—; 80–100% of the radicals $R_3$, $R_4$, $R_5$ and $R_6$, independently of one another, are $C_1$–$C_8$-alkyl and 0–20% of the radicals $R_3$, R4, $R_5$ and $R_6$, independently of one another, are $C_3$–$C_{12}$-alkenyl, unsubstituted or $C_1$–$C_4$ alkyl- or $C_1$–$C_4$-alkoxy-substituted phenyl, fluoro($C_1$–$C_{18}$-alkyl) or cyano($C_1$–$C_{12}$-alkyl).

4. A block copolymer according to claim 1, wherein the hydrophilic segment B is of formula (2).

5. A block copolymer according to claim 4, wherein $Q_1$ is a radical of formula

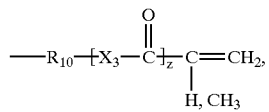
(7a)

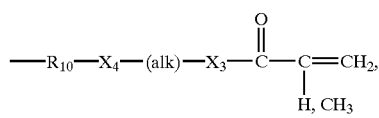
(7b)

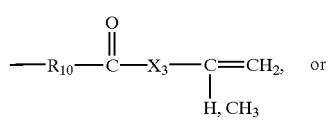
(7c)

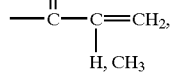
(7d)
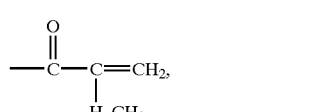

wherein $X_3$ is —O— or —NR", R" is hydrogen or $C_1$–$C_4$-alkyl, $X_4$ is a group —C(O)—O—, —O—C(O)—NH— or —NH—C(O)—O— or, (alk) is $C_1$–$C_8$-alkylene, z is an integer of 0 or 1, and $R_{10}$ is $C_1$–$C_{12}$-alkylene, phenylene or $C_7$–$C_{12}$-phenylenealkylene.

6. A block copolymer according to claim 4, wherein $R_1$ is $C_1$–$C_4$-alkyl, hydroxy-$C_1$–$C_4$-alkyl, trifluoromethyl or a radical —(CH$_2$)$_{2-4}$—O—$R_8$ wherein $R_8$ is acryloyl, methacryloyl or a group —C(O)—NH—(CH$_2$)$_2$—O—C(O)—C($R_9$)=CH$_2$, and $R_9$ is hydrogen or methyl.

7. A block copolymer according to claim 1, wherein L is a linking group of formula (3c).

8. A block copolymer according to claim 7, wherein $R_2$ in formula (3c) is linear or branched $C_6$–$C_{10}$alkylene, cyclohexylene-methylene or cyclohexylene-methylene-cyclohexylene each unsubstituted or substituted in the cyclohexyl moiety by from 1 to 3 methyl groups, or phenylene or phenylene-methylene-phenylene each unsubstituted or substituted in the phenyl moiety by methyl.

9. A block copolymer according to claim 1 of the formula

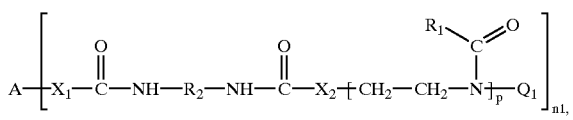
(1a)

wherein n1 is an integer of 2,
A is a-perfluoroalkyrl-polyether or polysiloxane segment;
$X_1$ and $X_2$ are each independently of the other —O— or —NH—;
$R_2$ is inear or branched $C_6$–$C_{10}$alkylene, cyclohexylene-methylene or cyclohexylene-methylene-cyclohexylene each unsubstituted or substituted in the cyclohexyl moiety by from 1 to 3 methyl groups, or phenylene or phenylene-methylene-phenylene each unsubstituted or substituted in the phenyl moiety by methyl;
$R_1$ is $C_1$–$C_4$-alkyl, hydroxy-$C_1$–$C_4$-alkyl, trifluoromethyl or a radical —(CH$_2$)$_{2-4}$—O—$R_8$ wherein $R_8$ acryloyl, methacryloyl or a group—C(O)—NH—(CH$_2$)$_2$—O—C(O)—C($R_9$)=CH$_2$, and $R_9$ is hydrogen or methyl; and
$Q_1$ is a radical of formula

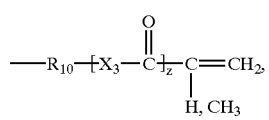
(7a)

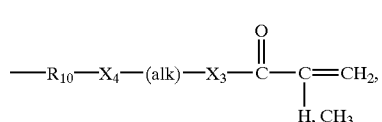
(7b)

(7c)

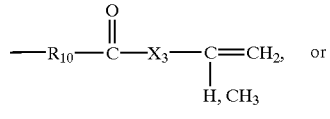
(7d)

wherein $X_3$ is —O— or —NR", R" is hydrogen or $C_1$–$C_4$-alkyl, $X_4$ is a group —C(O)—O—, —O—C(O)—NH— or —NH—C(O)—O—, (alk) is $C_1$–$C_8$-alkylene, z is an integer of 0 or 1, and $R_{10}$ is $C_1$–$C_{12}$-alkylene, phenylene or $C_7$–$C_{12}$-phenylenealkylene.

10. A block copolymer according to claim 1 of formula

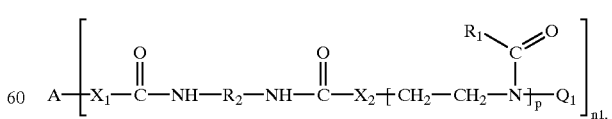
(1a)

wherein n1 is an integer from 3 to 8.

11. A process for the preparation of a block copolymer of formula (1) according to claim 1, wherein L is a linking group of formula (3a), (3b) or (3c), characterized in that a compound of formula

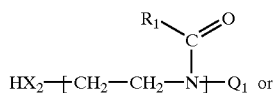

(10)

is reacted (i) with about n molar equivalents each of a compound of formula

Y—R$_2$—Y   (11) and

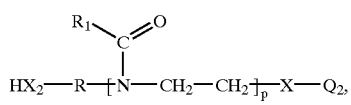

(12a)

or (ii) with about n molar equivalents each of a compound of the above formula (11) and (12b)

wherein Y is halogen, carboxy or a suitable derivative thereof or is a group —N=C=O; and A, Q$_1$, Q$_2$, R, R$_1$, R$_2$, X, X$_1$, X$_2$, n and p each have the meaning given in claim 1.

12. A process for the manufacture of a moulding, which comprises crosslinking a block copolymer of formula (1) according to claim 1 in a mould.

13. A process according to claim 12 wherein the moulding is an ophthalmic moulding and wherein the block copolymer is photo-crosslinked in an ophthalmic mould using actinic radiation.

14. A process according to claim 13, comprising the following steps:
   a) providing at least one block copolymer of formula (1) according to claim 1;
   b) preparing an at least partly bicontinuous mesophase of the prepolymer;
   c) introducing the mesophase obtained into an ophthalmic mould;
   d) triggering of the photocrosslinking; and
   e) opening the mould such that the molding can be removed.

15. A process according to claim 14, wherein the mesophase is prepared from one or more prepolymers, an aqueous solution and optionally further components selected from the group consisting of a photoinitiator, a surfactant, a comonomer and a pharmaceutical effective agent.

16. A process according to claim 14, wherein the mesophase is prepared from one or more than one different prepolymers, water and optionally a photoinitiator.

17. A moulding obtainable by a process according to claim 12.

18. A moulding according to claim 17, which is an ophthalmic moulding.

* * * * *